March 6, 1928. 1,661,851
E. H. REMDE
INDUSTRIAL TRUCK
Filed June 22, 1926  2 Sheets-Sheet 2
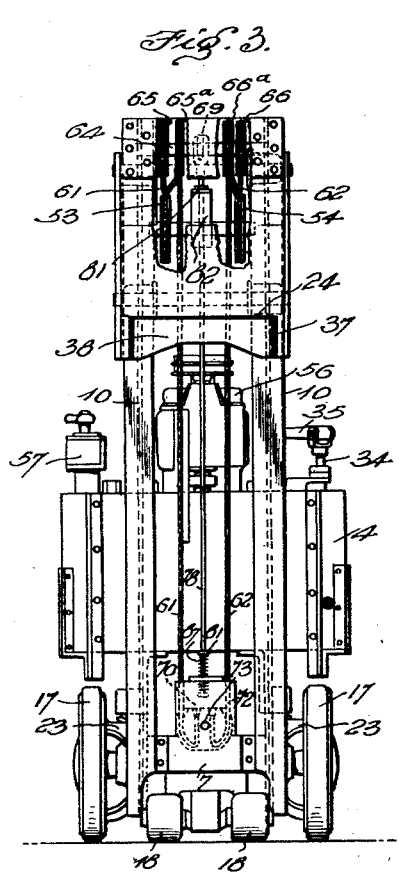
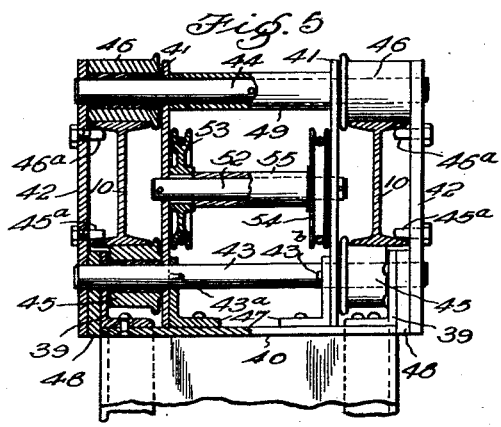
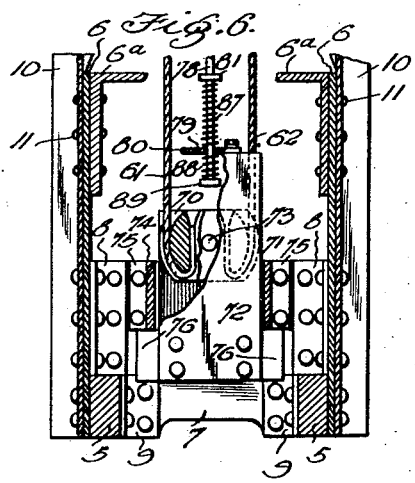
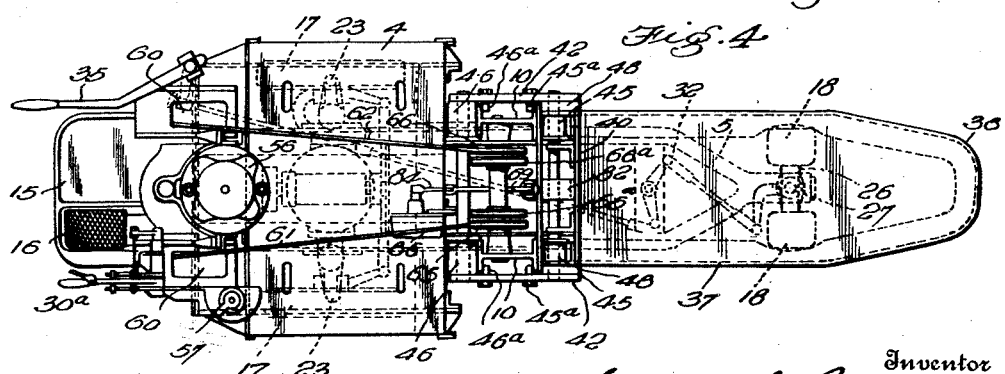
Inventor
Edward H. Remde
By Geo. B. Pitts
Attorney Patented Mar. 6, 1928.

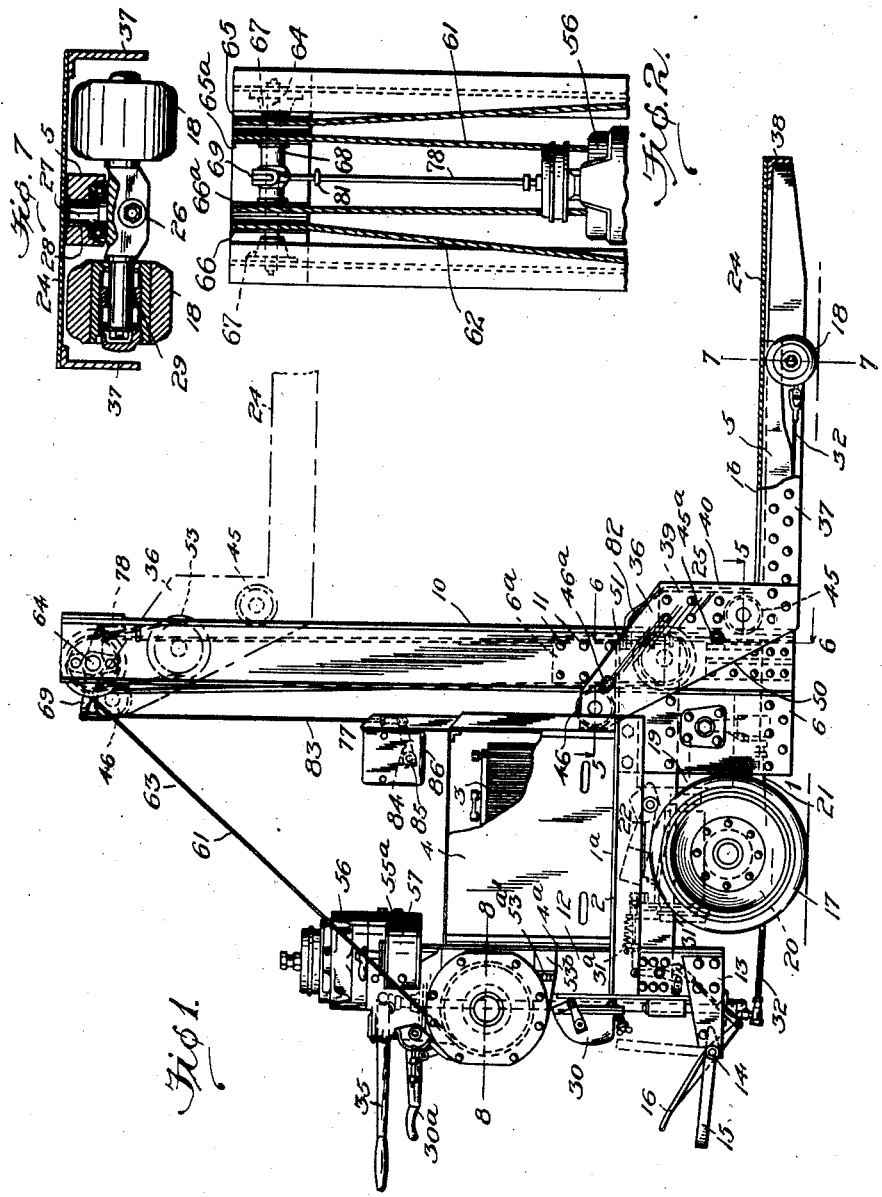

1,661,851

UNITED STATES PATENT OFFICE.

EDWARD H. REMDE, OF CLEVELAND, OHIO, ASSIGNOR TO THE BAKER-RAULANG COMPANY, OF CLEVELAND, OHIO, A CORPORATION OF OHIO.

INDUSTRIAL TRUCK.

Application filed June 22, 1926. Serial No. 117,780.

This invention relates to an industrial truck.

One object of the invention is to provide an improved truck of this character that is relatively simple in construction and cheap to manufacture and assemble.

Another object of the invention is to provide an improved truck of this character in which the elevating member may be operated to raise, lower or support loads with less strains on the guides therefor.

A further object of the invention is to provide an improved truck construction in which the elevating member is restrained against swinging movement when meeting an obstruction in moving downward, whereby engagement of the elevating member will immediately result in effecting slack in the hoisting cables so that such slack may be utilized to stop the motor before the elevating member has moved any substantial distance.

Other objects of the invention will be apparent to those skilled in the art to which my invention relates from the following description taken in connection with the accompanying drawings, wherein Fig. 1 is a side view of a truck embodying my invention.

Fig. 2 is a fragmentary end view looking towards the right of Fig. 1.

Fig. 3 is an end view looking towards the left of Fig. 1, but showing the elevating member raised.

Fig. 4 is a plan view of the truck.

Fig. 5 is a section on the line 5—5 of Fig. 1.

Fig. 6 is a section on the line 6—6 of Fig. 1.

Fig. 7 is a section on the line 7—7 of Fig. 1.

In the drawings, 1 indicates the frame preferably constructed to form a main or elevated section 1$^a$ and a lower or drop section 1$^b$. The main section serves as a platform 2 for a suitable source of power, for example, a plurality of batteries 3 preferably enclosed in a casing 4. The drop section 1$^b$ comprises a pair of bars 5, having converging portions united at their free ends in a suitable manner, as by welding. The frame sections 1$^a$, 1$^b$, are rigidly connected together in a well known manner by a pair of spaced plates 6. The plates 6 are preferably braced and tied together by a transverse plate 7, angles 8, 8, and 9, 9, being provided to secure the plate 7 to the plates 6 and bars 5.

10 indicates a pair of guides mounted on the frame 1, these guides in the preferred form of construction being disposed at the inner ends of the frame sections 1$^a$, 1$^b$, and mounted in rigid relation to the frame 1.

The guides 10 may comprise a pair of I-beams, the flanges on their inner sides and along their lower portions being removed so that their webs may be rigidly secured in face to face relation with the outer faces of the plates 6.

12 indicates uprights disposed adjacent the outer end of the frame section 1$^a$ and supporting a dash 4$^a$. At their lower ends, the uprights carry a pair of brackets 13, which in turn support the opposite ends of a shaft 14. 15 indicates a platform for the operative swingably mounted on the shaft 14. 16 indicates a brake pedal also mounted on the shaft 14 and associated with the platform for operation by the operative standing thereon.

17, 18 indicate pairs of wheels for supporting the frame 1. The wheels 17 are disposed below the frame section 1$^a$ and are driven through a suitable power transmission mechanism mounted in a housing 20 and operated by a motor 19. The construction of the motor and power transmission mechanism may be similar to that shown in Letters Patent No. 1,628,145 granted to John H. Hertner and myself, jointly. The housing 20 and motor 19 are suspended between the axle mechanism for the wheels 17 and frame 1 by a suspension mechanism 22. This suspension mechanism 22 is not described or claimed herein, since it forms the subject-matter of said patent. The wheels 17 are mounted on an axle 26 having a shaft 27 mounted in a bearing 28 formed in the connected-together portion of the bars 5 adjacent their free ends. 29 indicates suitable anti-friction bearings for the wheels 18. The construction of each of the wheels 18 being the invention of John H. Hertner and described in a co-pending application filed by him, no claim thereto is made herein. 30 indicates a controller for operating the motor 19. 30ª indicates a handle connected to the controller shaft in any desired manner. 31 indicates a brake mechanism acting on an element driven by the motor 19, being normally operated by a spring 31ª and connected to the pedal 16, whereby it may be released.

32 indicates the steering connections for and between the pairs of wheels 17, 18, whereby they are steered simultaneously, these connections being connected to an arm 33 (see Fig. 2) on the lower end of the steering column 34 to which the handle 35 is connected.

The elevating member 25 comprises a shoe section 36 and the platform load carrying and supporting section 24 (already referred to). The platform section 24 consists of a section of angle bar stock bent to form a pair of side sills 37, an end sill 38 and vertical arms 39. The shoe section 36 consists of a vertical plate 40, pairs of inner and outer shoe plates 41, 42, with the plates of each pair disposed parallel to each other and on opposite sides of and in close relation to the adjacent I-beam 10, a pair of parallel shafts 43, 44, extending through and supported in aligned openings in the shoe plates 41, 42, and pairs of flanged rollers 45, 46, supported on the shafts 43, 44, respectively. By preference each of the shafts 43, 44, may be held against rotative movement by a pin 43ª, fitting an opening in one of the shoe plates and against endwise movement by a cotter pin 43ᵇ. As shown in Fig. 5, the plates 41 are secured to the plate 40 by angles 47 and the plate 40 and plates 42 are mounted in fixed relation by being secured to the flanges of the arms 39, spacers 48 being provided between the plates 42 and the adjacent flanges. The flanges of the arms 39, the angles 47 and spacers 48 are extended inwardly beyond the shaft 43 and are formed with openings through which the shaft extends and thus serve to re-inforce the shaft openings formed in the plates 41, 42.

49 indicates a sleeve on the shaft 44 extending between the plates 41 and serving to maintain their free ends in spaced relation and parallel to the plates 42. By preference the rollers 45, 46, are mounted on suitable bushings which at their opposite ends engage with and hence maintain the plates 41, 42, in spaced relation so that danger of the rollers being wedged between these plates is avoided.

In my form of construction the rollers 45, 46, are mounted on parallel shafts and disposed upon the opposite outer sides of the I-beams 10. As a result the strain on the guide beams 10 incident to the weight of the load is carried by relatively broad surfaces and in line with the webs of the beams, so that the full compression strength of the latter resists the load. This arrangement eliminates strain on either guide beam flange, which is liable to break or become distorted where the load is relatively heavy. As will be understood from Fig. 1, the rollers 45 engage the front end flanges of the beams 10 and the rollers 46 engage the rear flanges thereof and the rollers 45 are disposed in a plane below the rollers 46, so that the weight of the platform 24 tends to keep these rollers in engagement with the front and rear flanges while permitting the elevating member to be raised and lowered thereon. 45ª, 46ª, indicate co-operating shoe or guide devices which are adapted to engage with the guides 10 and serve to prevent or restrain the elevating member against swinging movement when or if it engages an obstruction in its downward movement. The advantages resulting will later appear. The devices 45ª, 46ª, preferably comprise pins or studs extending inwardly from either or both plates 40 and in operative relation to the inner surfaces of the flanges of the I-beams 10. The pins 45ª, 46ª, on each plate 40 are spaced from each other, each being preferably disposed on the inner side of the guide flange opposite to one of the rollers 45 or 46. Each pin may be threaded or otherwise fitted into an opening formed in the web of the beam, its outer end being shaped, for example, provided with a polygonal head, to receive a tool and its inner end being conical to conform to the inclined surface of the flange. By this construction, the pins may be adjusted endwise to vary their operative relation to the flanges of the guides. To reduce the amount of material as well as to insure clearances, the plates 41, 42, may be cut off on the inclined lines indicated at 50, 51.

52 indicates a transverse shaft supported at its opposite ends in the plates 41, preferably in a plane midway between vertical planes cutting the axes for the shafts 43, 44, so as to mount the shaft 52 midway between the guide faces formed by the guide beams 10. 53, 54, indicate sheaves loosely mounted on the shaft 52, preferably arranged closely adjacent to the plates 41. 55 indicates a sleeve loose on the shaft 52 and serving to space the sheaves apart, the ends of the sleeve co-acting with the plates 41 to maintain the sheaves in this position. The purpose of the sheaves will later appear. The shaft 52 is preferably held in position by a pair of cotter pins.

53ª indicates a casting forming a housing for a power transmitting mechanism and a cradle 55ª for a motor 56 (preferably of the electric type and connected with the batteries 3 by means of a controller 57). The casting 53ª is suitably mounted on the uprights 12—see Fig. 1. The power transmitting mechanism 55 operates through suitable reduction gearings to drive drums 60, in one direction or the other according to the direction of rotation of the motor shaft, to wind sections 61, 62, of a flexible member 63 (such as a cable) thereon or therefrom. The drums 60 are partially enclosed in casings 60ª, supported by the casting 53ª.

64 indicates a shaft mounted at the upper ends of the guides 10, preferably mounted at its opposite ends in openings formed in the webs of the I-beams.

65, 65ª, 66, 66ª, indicate pairs of sheaves each loosely mounted on the shaft 64, each pair being spaced from the adjacent web by a collar 67 and from each other by a pair of sleeves 68 and the hub of a lever 69 to which reference will later be made. The section 61 of the flexible member 63 leads from one drum 60 over and around the sheave 65, then down and around the sheave 53; from this latter sheave it leads up and around the sheave 65ª and then down to a rotative equalizing element 70. The section 62 of the flexible member 63 leads from the other drum 60 over and around the sheave 66, then down and around the sheave 54; from this latter sheave it leads up and around the sheave 66ª and then down to the equalizing element 70. Where the sections 61, 62, are formed from a single length of cable, those portions extending downwardly from the sheaves 65ª, 66ª, may extend around the equalizing element 70, in which event this element may consist of a sheave; but preferably these cable sections terminate at and are connected to the equalizing element 70. For this purpose the opposite sides of the equalizing element 70 are formed with grooves concentric to its axis to receive the flexible sections and its body portion is formed with openings into which the free ends of the flexible sections 61, 62 are fitted and removably secured, as shown in Fig. 6.

From the foregoing description it will be understood that (1) when the drums 60 are rotated to wind the flexible sections thereon the elevating member 25 is hoisted or elevated along the guides 10; and (2) when the drums are driven in the opposite direction the elevating member moves downwardly.

71 indicates as an entirety a take up mechanism serving to take up slack in the flexible hoisting sections 61, 62, if for any reason the movement of the elevating member downwardly is arrested or slowed down. The take up mechanism preferably comprises a weighted member 72, supporting the studshaft 73 on which the equalizing element 70 is rotatively mounted. The weighted member 72 is slidably mounted between the plate 7 and the walls of a yoke 74, having its feet 75 riveted to the plate 7. At its lower end the member 72 is extended laterally to form projections 76 which engage the lower edge of the yoke 74 to limit the upward movement of the member 72 due to the pull on the flexible sections 61, 62, in supporting or operating the elevating member 25, but if slack occurs in these sections, the member 72 will gravitate downwardly and thus take up the slack without danger of the flexible sections jumping any of the sheaves or getting dislocated on their winding drums.

77 indicates a limiting mechanism operable when the elevating member 25 reaches a predetermined position in moving in either direction to cut off the current to the motor 56. Of the limiting mechanism 77, 78 indicates a rod supported at its upper end by one arm of the lever 69 and guided by the walls of an opening 79 formed in a bracket 80. The bracket 80 is carried by the upper end of the weighted member 72—see Fig. 6. 81 indicate tappets adjustably fixed to the rod 78 and disposed in the path of movement of an arm 82 supported by the plate 40 and extending upwardly and inwardly therefrom—see Fig. 1. If the elevating member 25 is operated in either direction without stopping its motor, the arm 82 will engage a tappet 81 and move the rod 78 endwise. The rod 78 will rock the lever 69 which will move a link 83 connected to the other end of the lever, and the link in turn will operate an arm 84. The arm 84 is connected to a rock shaft 85 mounted in the walls of a casing 86 enclosing pairs of contacts through which current is established to operate the motor 56. One contact of each pair is movable and arranged to be operated by an element fixed to the rock shaft 85 within the casing, so that when the rod 78 is operated as above described, the circuit for the motor 56 is opened.

87 indicates a spring interposed between one side of the bracket 80 and the adjacent tappet 81. 88 indicates a spring interposed between the other side of the bracket 80 and a head 89. As will be understood from Fig. 3, the springs 87, 88, acting on the tappet 81 and head 89, normally tend to maintain the rod 78 and the elements connected to and actuated by it in normal position. If the rod 78 is moved by reason of the engagement of the arm 82 with either tappet, due to movement of the elevating member in one direction, one or the other of these springs will be put under tension, the effect of which will be to return the rod to its normal position upon movement of the elevating member in the opposite direction. The springs 87, 88, are associated with a part of the weighted member 72, in this instance the bracket 80, so that the same means may be utilized to cut off the current to the motor 56 upon the operation of the take up mechanism 71. Accordingly, it will be seen that if the weighted member 72 gravitates, the bracket 80 will operate through the spring 88 and head 89 to move the rod 78 downwardly and thus open the circuit through one of the pairs of contacts in the casing 86. The switch and the limiting mechanisms form the subjects-matter of separate co-pending applications filed by me and the take-up mechanism and its association with a limiting mechanism form the subject matter of a co-pending application filed by A. G. Hutzley, for which reason no claim is made herein to these parts and mechanisms. If the elevating member, in its downward movement should, by accident or otherwise, engage with an obstruction, its outer portion would be held stationary while its inner portion being supported by the cables 61, 62, would continue gravitating downwardly as fast as the cables were paid out by the drums 60. In other words, the obstruction would form a fulcrum and the inner portion of the elevating member would continue to be supported by the cables and swing about such fulcrum as the drums continued paying the cables out. As a result no slack would occur in the cables 61, 62, and this swinging movement would continue until damage resulted to the truck. To prevent these conditions arising I provide the co-operating shoe devices 45ª, 46ª, which co-act with the guides and rollers 45, 46, to maintain the elevating member in sliding relation to the guides 10 so that if the elevating member engages an obstruction, the shoe devices 45ª, 46ª will engage the guides and prevent the swinging movement above referred to, so that such obstruction will stop bodily downward movement of the elevating member. As a result slack in the cables 61, 62, will occur and this slack will permit the take-up mechanism to operate and it in turn effect the opening or breaking of the motor circuit.

As shown, the co-operating shoe devices are preferably supported in relatively close relation, but out of contact with the guide flanges to avoid friction and permit free rolling engagement of the rollers 45, 46, with the guides. When so supported and arranged, they will be in operative relation to the guide flanges and thus immediately engage therewith to prevent the elevating member from swinging, so that the latter will be arrested or stopped as already set forth. The shoe devices may carry suitable rollers adapted to roll on the flanges of the guides during the raising and lowering of the elevating member; however, I prefer to provide a clearance of approximately one-eighth inch between the devices and flanges.

To those skilled in the art to which my invention relates many changes in construction and widely differing embodiments and applications of the invention will suggest themselves without departing from its spirit and scope. My disclosures and the description herein are purely illustrative and are not intended to be in any sense limiting.

What I claim is:

1. In apparatus of the class described, the combination of a wheeled frame, a guide frame thereon, an elevating member having shoe elements engaging the forward and rear sides of the guide frame, means for raising and lowering said elevating member, and means carried by said elevating member and co-acting with portions of the guide frame between their forward and rear sides to prevent swinging movement of the elevating member following its engagement with an obstruction.

2. An apparatus as claimed in claim 1 in which the guide frame comprises I-beams and the shoe elements engage the outer surfaces of the flanges thereof and the co-acting means are disposed in operative relation to the inner surfaces of the flanges.

3. In apparatus of the class described, the combination of a wheel mounted frame, a pair of guide members thereon, an elevating member having a shoe plate disposed in close relation to each said guide member, a pair of shafts extending through said shoe plates and supporting a pair of rollers in engagement with the opposite side walls of said guide members, means for raising and lowering said elevating member, and devices carried by one of said shoe plates disposed in operative relation to a portion of said guide members to prevent swinging movement of the elevating member when it engages an obstruction.

4. An apparatus as claimed in claim 3 in which the raising and lowering means include a pair of flexible members and receiving elements carried by the upper portion of and between said guide members and said elevating member.

5. An apparatus of the class described, the combination of a wheel mounted frame, a pair of guide members thereon, an elevating member having a shoe plate disposed in close relation to each said guide member, a pair of shafts extending through said shoe plates and supporting a pair of rollers in engagement with the opposite side walls of said guide members, a shaft supported by said member, a shaft carried by the upper portions of said elevating guide members, sheaves on said shafts, flexible members operatively engaging said sheaves, means for winding up and unwinding said flexible members to raise and lower said elevating member, and devices between one of said guides and said elevating member to maintain said rollers in engagement with said guide member.

6. An apparatus as claimed in claim 5 in which said guide members comprise beams having flanges and said devices are carried by the elevating member and are disposed in operative relation to the flanges of the adjacent guide member.

7. An apparatus as claimed in claim 5 in which said devices are adjustable.

8. In apparatus of the class described, the combination of a wheel mounted frame, a guide frame thereon, an elevating member having inner and outer shoe elements engaging opposite portions of said guide frame, means for raising and lowering said elevating member, and means carried by said elevating member and co-acting with a portion of said guide frame to prevent swinging movement of said elevating member following its engagement with an obstruction, said co-acting means comprising a device disposed below the inner shoe element.

In testimony whereof, I have hereunto subscribed my name.

EDWARD H. REMDE.